United States Patent [19]

Giebler

[11] 3,922,487

[45] Nov. 25, 1975

[54] CIRCUIT ARRANGEMENT FOR ADJUSTING THE LINE CURRENT IN TELEGRAPHY SUBSCRIBER CONNECTION CIRCUITS OF AN EXCHANGE INSTALLATION

[75] Inventor: Fritz Giebler, Munich, Germany

[73] Assignee: Siemens Aktiengesellschaft, Berlin & Munich, Germany

[22] Filed: July 15, 1971

[21] Appl. No.: 162,914

[30] Foreign Application Priority Data

July 16, 1970 Germany .......................... 2035379

[52] U.S. Cl. .............................................. 178/69 R

[51] Int. Cl.[2] .......................................... H04L 25/02

[58] Field of Search ............ 307/60, 237, 264, 270, 307/297, 33, 34; 178/63 R, 63 E, 69 R, 69 E; 179/81 R, 170 G, 170 T

[56] References Cited

UNITED STATES PATENTS 3,251,951 5/1966 Meewezen ..................... 307/237 X

*Primary Examiner*—Ralph D. Blakeslee

[57] ABSTRACT

A circuit arrangement is described whereby the line current in telegraph subscriber connection circuits can be adjusted. Each connection circuit contains a supplementary resistance consisting of an electronically regulatable resistance which maintains constant current flow. Comparison techniques are used whereby the actual line current is compared against a reference value and adjustments are made accordingly.

3 Claims, 3 Drawing Figures

INVENTOR:

BY:

CIRCUIT ARRANGEMENT FOR ADJUSTING THE LINE CURRENT IN TELEGRAPHY SUBSCRIBER CONNECTION CIRCUITS OF AN EXCHANGE INSTALLATION

BACKGROUND OF THE INVENTION

The invention concerns a circuit arrangement for the adjusting of the line current in telegraphy subscriber connection circuits of an exchange installation, in which the subscriber connection circuits each contain an adjustable line supplementing resistance, which depending on the type and the length of the connection line is adjustable in such a way, that the line current flowing in the loop remains constant during the condition "current in the line."

In the present day telegraphy and data networks, a direct current transmission technique with high transmission voltage is utilized on the local connection lines between the subscribers and the exchanges. Thereby, most of the subscribers EM, are connected over swith Sk as shown in FIG. 1, over two-wire-single current-lines L to the exchange.

The subscriber connection circuit in the exchange, as shown in FIG. 1, contains, in addition to the telegraph relay A, and the holding resistance RH, an adjustable duplicating resistance RN and an adjustable line supplementing resistance RL. When the circuit is put into operation, the duplicating resistance RN is so adjusted that the double current signals in the line *a*2, *b*2 exhibit minimal distortion. There has, however, previously been suggested a connection circuit in which the individual distortion matching (balancing) with the help of the duplicating resistance RN is no longer necessary (German patent application No. P 19 11 252.8, - 31). The necessary size of the line supplementing resistance RL depends on the type and the length of the line. The resistance connected in series to the loop must be so adjusted that with a keying voltage U (for example U = 120 volts) a line current I (I = 40nA) flows. Consequently, there results because of the different line length and the different line resistance dependent thereon, the necessity of an individual adjustment of the line supplementing resistance RL and the occurrence of high power loss in the line supplementing resistance in case of short circuit on the line L.

The invention is based on the problem of avoiding the individual adjustment of the line supplementing resistances and of minimizing the power loss in the office in case of a short circuit on the line and in case of grounding.

SUMMARY OF THE INVENTION

This object and others are achieved in accordance with the invention in that the adjustable line supplementing resistance is executed as an electronically regulatable resistance, which is controlled depending on the deviation of the line current actual value from the line current ideal value.

With the automatic adjustment of the line current and with the abandonment of individual balancing of the line supplementing resistance, and in some cases of the duplication resistance by the maintenance personnel it is achieved that in new connections and in change-over connections of teletypewriter connections each balancing operation in the exchange is eliminated. Therebeyond, the construction system for the connection circuits is simplified, since no consideration must be taken of good serviceability. In modern electronic exchange installations with cabinet construction systems, the invention makes possible a high packaging density and a simplified wiring. The power loss in the office is thereby reduced, in that, in case of a short circuit the electronically adjustable resistance is controlled to a higher resistance value. A further advantage of the inventive circuit consists therein that an additional power supply voltage is not necessary. The circuit can, therefore, be inserted in the telegraphy circuit with a bridge (rectifer) like a resistance.

In one advantageous embodiment of the invention, the regulation of electronically regulatable resistance is so strongly delayed, that its resistance value during the impulse flanks and current pauses remains nearly constant. A regulating circuit which works in an undelayed manner would quickly regulate the line current during the impulse flanks of the telegraph signals and thereby leave to an additional distortion of the characters in single current scanning.

The delay of the regulation is advantageously achieved in that the voltage drop generated at a measuring resistance by the line current — the actual value — is routed to a measured value memory. Then, this stored actual value is routed together with the ideal value to the comparor. Depending on the result of the comparison, the electronically regulatable resistance is adjusted.

To bridge the current pauses on the line, a condenser, which is charged during the duration of the current flow over a diode to a potential proportional to the line current, is sufficient as a rule as the measured value memory.

BRIEF DESCRIPTION OF THE DRAWINGS

Further details of the invention are explained in the following detailed description of a preferred embodiment with reference to the figures.

DETAILED DESCRIPTION OF THE DRAWINGS

Figure 1:
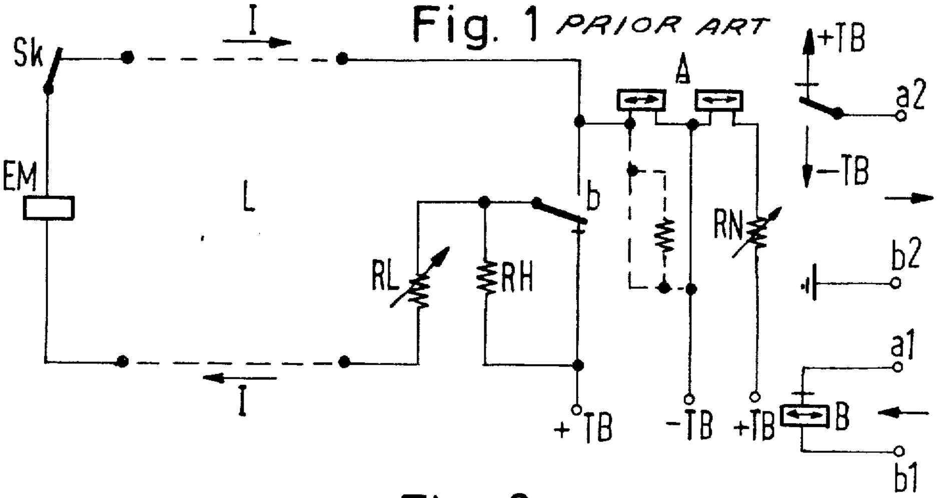
Fig. 1 PRIOR ART
FIG. 1 illustrates a prior art circuit.
Figure 2:
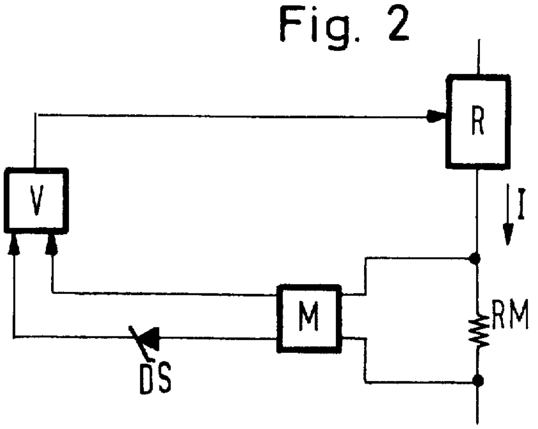
FIG. 2 illustrates a block circuit diagram of the inventive circuit.

The circuit represented in FIG. 2 replaces — connected in the central branch of a bridge — the line supplementing resistance RL in the arrangement of FIG. 1, which belongs to the state of the art. The line current I flows through the electronically regulatable resistance R and the measuring resistance RM. The voltage drop arising on the measuring resistance RM is routed to the measured value memory M which delays the regulation of the line resistance. In the comparator V, the actual value of the voltage at the measuring resistance RM given by the measured value memory M and the ideal value determined by the Zener diode DS are compared. The electronically regulatable resistance R is controlled corresponding to the result of the comparison.

Figure 3:
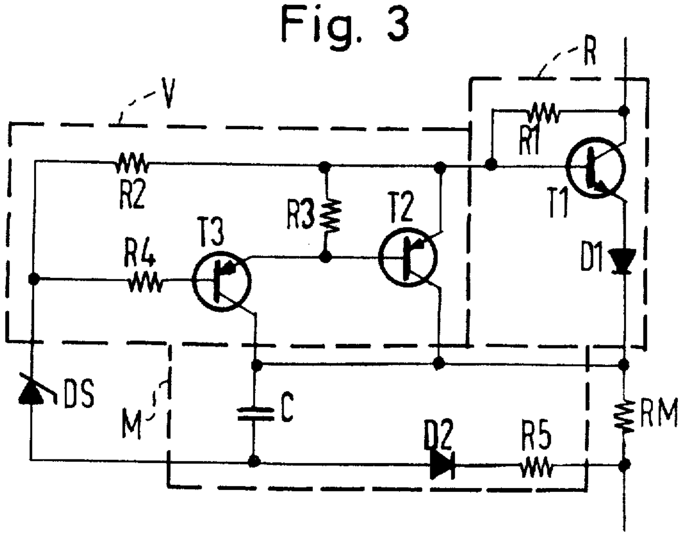
FIG. 3 is a schematic diagram which illustrates the realization of the circuit according to FIG. 2.

A realization of the arrangement according to FIG. 2 is shown by FIG. 3. The electronically regulatable resistance R comprises a transistor T1, the emitter-collector-path of which lies in the line carrying the line current I, resistance R1 connecting the base and the collector and of the diode D1, lying in series to the emitter-collector-path of the transistor T1, which diode generates a bias potential for the transistor T1. Based on the emitter-collector-path of the transistor T1, the resistance of the arrangement is R=R1/B, whereby B is the current amplification of the transistor B1. The electronically regulatable resistance R can be adjusted by opposite coupling or by reducing the base current with a parallel path.

A condenser C which, depending on the voltage at the measuring resistance RM, is charged over the diode D2, and the resistance R5 is utilized as the measured value memory M. The amplifier constructed from the transistors T2 and T3 and the resistances R2, R3 and R4 functions as comparator V. The comparor lies with its reference point on the base of the transistor T1 and thereby, displaced by the base-emitter voltage of the transistor T1 and the permeability voltage of the diode D1, on the reference point of the condenser C. As soon as the voltage at the condenser C during the current flow through the measuring resistance RM has increased to the point that a current can flow through the Zener diode DS, through the resistance R4 and the transistor T3, the transistor T2 becomes conductive. The emitter-collector-path of the transistor T2 now is parallel to the base-emitter-path of the transistor T1 and to the diode D1. A portion of the current flowing through the resistance R1 now flows through the transistor T2. The base current of the transistor T1 thereby becomes smaller. The circuit adjusts itself to an equilibrium determined by the measuring resistance RM and the diode DS and regulates the line current I to the ideal value. During the interruption of the line current in the transmission of the teletypewriter signals, the control current for the transistor T2 and the transistor T3 is delivered from the condenser C. The resistance of the electronically regulatable resistance maintains the value set during the current flow.

The maximum resistance of the arrangement according to FIG. 3 results when the transistor T1 is blocked. The resistance then has approximately the value R1+RM. The minimum resistance is achieved, when the transistor T2 is blocked. It then amounts to R1/B + RM.

With the delayed regulation, the circuit is especially suitable for inclusion on telegraph circuits with single current keying. However, it can, just as well, be included as a line supplement in telegraph circuits with double current keying.

I claim:

1. Apparatus for adjusting the magnitude of line current in telegraph subscriber connection circuits, each said connection circuit including a supplementary resistance for maintaining a constant current flow, comprising:

means for sensing the magnitude of the line current, means for comparing said sensed magnitude with a reference magnitude, and for producing an output corresponding to the difference between said magnitudes, adjustable resistance means in the line current path forming said supplementary resistance, means for adjusting said adjustable resistance in dependence on the value of said comparison means output and means for introducing delay into the adjustment of said adjustable resistance means, the magnitude of said delay being such that the value of said adjustable resistance means remains substantially constant during pulse edges and intervals between pulses.

2. The apparatus defined in claim 1 wherein said delay means is interposed between said sensing means and said comparison means.

3. The apparatus defined in claim 1 wherein said adjustable resistance means comprises:

a transistor with the emitter-collector path thereof being connected in series with the path of said line current, and a resistor connected between the base and collector of said transistor, an output of said adjusting means being introduced over the base of said transistor.

* * * * *